(12) United States Patent
Perry et al.

(10) Patent No.: US 9,761,889 B2
(45) Date of Patent: Sep. 12, 2017

(54) FUEL CELL FLOW FIELD CHANNEL WITH PARTIALLY CLOSED END

(75) Inventors: Michael L. Perry, South Glastonbury, CT (US); Ned Emidio Cipollini, Enfield, CT (US)

(73) Assignee: Audi AG, Ingolstadt (DE)

( * ) Notice: Subject to any disclaimer, the term of this patent is extended or adjusted under 35 U.S.C. 154(b) by 1800 days.

(21) Appl. No.: 12/094,476

(22) PCT Filed: Dec. 28, 2005

(86) PCT No.: PCT/US2005/047587
§ 371 (c)(1),
(2), (4) Date: May 21, 2008

(87) PCT Pub. No.: WO2007/086828
PCT Pub. Date: Aug. 2, 2007

(65) Prior Publication Data
US 2008/0292938 A1  Nov. 27, 2008

(51) Int. Cl.
*H01M 8/0258* (2016.01)
*H01M 8/04089* (2016.01)
*H01M 8/04223* (2016.01)

(52) U.S. Cl.
CPC ..... *H01M 8/0258* (2013.01); *H01M 8/04089* (2013.01); *H01M 8/04223* (2013.01); *H01M 2250/20* (2013.01); *Y02T 90/32* (2013.01)

(58) Field of Classification Search
CPC .............. H01M 8/0267; H01M 8/026; H01M 8/0265
USPC ................ 429/428–429, 443–444, 446, 452, 429/544–545, 456–457, 463, 467–469, 429/507–509, 512–514, 535
See application file for complete search history.

(56) References Cited

U.S. PATENT DOCUMENTS

| | | | |
|---|---|---|---|
| 4,818,640 A * | 4/1989 | Fukuda et al. | 429/509 |
| 5,641,586 A | 6/1997 | Wilson | |
| 5,776,625 A | 7/1998 | Kaufman | |
| 5,919,584 A * | 7/1999 | Akagi | 429/416 |
| 6,218,038 B1 * | 4/2001 | Oko | H01M 8/0267 429/434 |
| 6,472,095 B2 * | 10/2002 | Margiott | H01M 8/023 429/513 |
| 6,485,857 B2 | 11/2002 | Perry et al. | |
| 6,635,378 B1 | 10/2003 | Yang | |

(Continued)

FOREIGN PATENT DOCUMENTS

| | | |
|---|---|---|
| EP | 1519438 | 7/2004 |
| JP | 2003-217607 A | 7/2003 |

(Continued)

OTHER PUBLICATIONS

Machine Translation and Abstract in English of JP 2004-253366.*

(Continued)

*Primary Examiner* — Maria J Laios
*Assistant Examiner* — Angela Martin
(74) *Attorney, Agent, or Firm* — Seed IP Law Group LLP

(57) ABSTRACT

A device (10) for use in a fuel cell includes a fuel-cell flow-field channel (18) having a channel-inlet section (42) and a channel-outlet section (44). At least one of the channel-inlet section (42) or the channel-outlet section (44) includes an obstruction member (46) that partially blocks flow through the fuel-cell flow-field channel (18).

18 Claims, 4 Drawing Sheets

(56) References Cited

U.S. PATENT DOCUMENTS

| | | | |
|---|---|---|---|
| 2001/0041281 A1 | 11/2001 | Wilkinson et al. | |
| 2002/0119360 A1 | 8/2002 | Dong | |
| 2002/0127443 A1 | 9/2002 | Breault | |
| 2002/0150807 A1 | 10/2002 | Yang | |
| 2003/0129468 A1 | 7/2003 | Issacci et al. | |
| 2004/0067405 A1 | 4/2004 | Turpin et al. | |
| 2004/0146756 A1 | 7/2004 | Boehm | |
| 2004/0151960 A1 | 8/2004 | Rock | |
| 2005/0079401 A1* | 4/2005 | Park | 429/38 |
| 2005/0221151 A1* | 10/2005 | Suzuki | H01M 8/0247 429/434 |
| 2005/0255364 A1 | 11/2005 | Cho | |
| 2005/0255366 A1* | 11/2005 | Tighe | H01M 8/0258 429/447 |
| 2005/0277005 A1* | 12/2005 | Itou | 429/24 |

FOREIGN PATENT DOCUMENTS

| | | | | |
|---|---|---|---|---|
| JP | 2004-241141 A | | 8/2004 | |
| JP | 2004253366 A | * | 9/2004 | H01M 8/02 |
| JP | 2005-339901 | * | 12/2005 | H01M 8/02 |
| JP | 2005-339901 A | | 12/2005 | |
| WO | WO 2005057707 A1 | * | 6/2005 | H01M 8/04 |

OTHER PUBLICATIONS

Extended Search Report mailed Jul. 1, 2010 for EP05858766.
Search Report PCT/US05/047587, (dated Sep. 27, 2007).
International Preliminary Report on Patentability dated Jul. 24, 2008, (for PCT/US05/47587).
European Search Report for European Patent Application No. 13160201.3-1360 completed Apr. 17, 2013.

* cited by examiner

FUEL CELL FLOW FIELD CHANNEL WITH PARTIALLY CLOSED END

FIELD OF THE INVENTION

This invention generally relates to fuel cells and, more particularly, to flow fields for fuel cells.

DESCRIPTION OF THE RELATED ART

Fuel cells are widely known and used for generating electricity in a variety of applications. A typical fuel cell utilizes reactant gases, such as hydrogen or natural gas and oxygen, to generate an electrical current. Typically, the fuel cell includes adjacent flow fields that each receives a reactant gas. Each flow field distributes the reactant gas through a gas distribution layer to a respective anode catalyst or a cathode catalyst adjacent an electrolyte layer to generate the electrical current. The electrolyte layer can be any layer that effectively transports ions, but does not conduct ions. Some example fuel-cell electrolytes include: alkaline solutions (e.g., KOH), proton-exchange membranes (PEM), phosphoric acid, and solid oxides.

One type of flow field includes entrance channels interdigitated with exit channels. The entrance channels have fully open inlets and fully closed outlets and the exit channels have fully closed inlets and fully open outlets. The fully closed outlets of the entrance channels force a reactant gas entering the entrance channels to flow through the gas distribution layer into an adjacent exit channel. This results in forced convection of the reactant gas toward the catalyst and relatively greater exposure of reactant gas to the catalyst. The forced convection, however, increases a pressure drop of the reactant gases across the flow field and therefore requires a higher pressurization of the reactant gases, which undesirably consumes some of the electrical energy generated by the fuel cell and lowers overall efficiency.

A typical flow field includes open, or parallel, channels that have fully open inlets and fully open outlets. A reactant gas entering though the channel diffuses through the gas distribution layer toward the catalyst. The open channels allow relatively unrestricted reactant gas flow and thereby produce a relatively low reactant gas pressure drop. However, a relatively low proportion of the reactant gases flowing through the channels diffuses to the catalyst, which undesirably results in inefficient utilization of the reactant gases.

This invention addresses the need for improved balance between pressure drop and efficient reactant gas utilization.

SUMMARY OF THE INVENTION

One example device for use in a fuel cell includes a fuel cell flow field channel having a channel inlet section and a channel outlet section. At least one of the channel inlet section or the channel outlet section includes an obstruction member that partially blocks flow through the fuel cell flow field channel.

One example includes a flow passage between elongated channel walls. An obstruction member extends into the flow passage between the elongated channel walls to partially block flow through the fuel cell flow field channel.

Another example includes a closure member that extends adjacent to a channel outlet section or a channel inlet section to partially block respective outlet or inlet flow.

One example includes a plate having openings that extend through the plate. The plate is movable relative to a fuel cell flow field channel to partially block flow through the fuel cell flow field channel.

The above examples are not intended to be limiting. Additional examples are described below. The various features and advantages of this invention will become apparent to those skilled in the art from the following detailed description. The drawings that accompany the detailed description can be briefly described as follows.

DETAILED DESCRIPTION OF THE PREFERRED EMBODIMENTS

Figure 1:
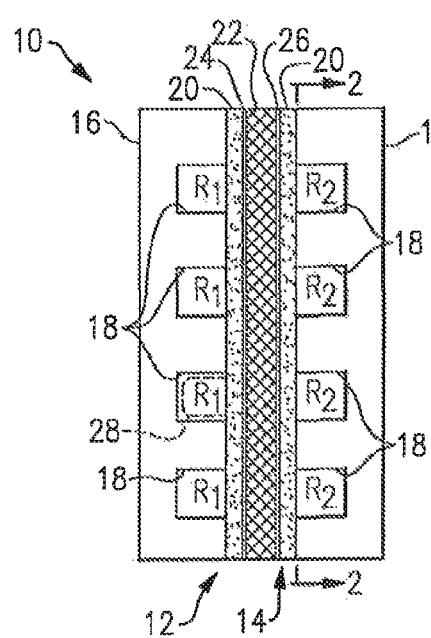
FIG. 1 schematically illustrates selected portions of a fuel-cell stack.

FIG. 1 schematically illustrates selected portions of an example fuel cell stack 10 for generating electricity. In this example, an anode side 12 receives a reactant gas $R_1$ and a cathode side 14 receives a reactant gas $R_2$ to generate an electric current in a known manner. Each of the anode side 12 and the cathode side 14 includes a flow field plate 16, such as a machined plate, molded plate, stamped plate, solid plate, porous plate, or other type of plate, having channels 18 for distributing the reactant gasses $R_1$ and $R_2$ over the respective anode side 12 and cathode side 14.

In the illustrated example, a gas exchange layer 20 is located adjacent each of the flow field plates 16. An electrolyte layer 22 spaces an anode catalyst 24 from a cathode catalyst 26 between the gas exchange layers 20.

In the illustrated example, the channels 18 have a rectangular cross-sectional profile. In another example, the channels 18 have a curved profile, such as that shown in phantom at 28. Given this description, one of ordinary skill in the art will recognize what channel shapes will meet their particular needs.

In one example, to demonstrate the operation of the fuel cell stack 10, the reactant gasses $R_1$ and $R_2$ are fed into the channels 18 of the respective anode side 12 and cathode side 14. The reactant gasses $R_1$ and $R_2$ diffuse, or move by forced convection, through the gas exchange layers 20 toward the respective anode catalyst 24 or cathode catalyst 26. The electrolyte layer 22 operates in a known manner to allow ion exchange between the anode catalyst 24 and the cathode catalyst 26 to generate an electrical current through an external circuit (not shown).

Figure 2:
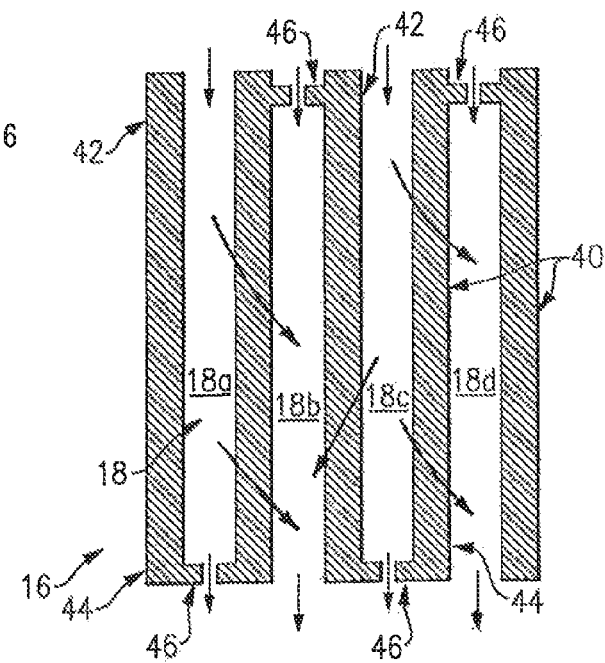
FIG. 2 is a cross-sectional view taken along the lines shown in FIG. 1 that illustrates an embodiment having channels with example obstruction members that partially block flow through the channels.

FIG. 2 shows one of the flow field plates 16 according to the section lines shown in FIG. 1. In this example, the channels 18 extend between opposed channel walls 40. Each of the channels 18 includes an inlet section 42 and an outlet section 44. The reactant gas flows into the inlet section 42, through the channels 18 and out the outlet section 44. In this example, the outlet sections 44 of channels 18*a* and 18*c* and the inlet sections 42 of channels 18*b* and 18*d* each include an obstruction member 46.

In the illustrated example, the obstruction members 46 extend from the elongated channel walls 40 into the channels 18. The obstruction members 46 partially block the channels 18 to restrict the flow of reactant gas into channels 18*b* and 18*d* and restrict outflow of reactant gas from channels 18*a* and 18*c*.

In one example, the size of at least one of the obstruction members 46 is determined as a percentage of the cross-sectional area of the channel 18 (best shown in FIG. 1) into which the obstruction member 46 extends. A higher percentage blocks more flow and a lower percentage blocks less flow.

In one example, the obstruction member 46 blocks greater than about 0% and below about 100% of the respective channel 18 cross-sectional area. In another example, the obstruction member 46 blocks between about 70% and about 90% of the channel 18 cross-sectional area. In another example, the obstruction member 46 covers about 80% of the channel 18 cross-sectional area.

The obstruction members 46 of the above examples are formed by any of a variety of methods. In one example, a known compression molding process is used to form the flow field plate 16. Selected inlet sections 42 and outlet sections 44 are molded with fully closed ends. The obstruction members 46 are then machined from the fully closed ends of the selected inlet sections 42 and outlet sections 44. In another example, the obstruction members 46 are formed in a near net-shape molding process and require little or no machining. Given this description, one of ordinary skill in the art will recognize additional methods of making the obstruction members 46 to suit their particular needs.

The size of the obstruction members 46 controls a balance between reactant gas pressure drop across the fuel cell stack 10 and reactant gas utilization efficiency. Channels 18*a* and 18*c* receive reactant gas through fully open inlet sections 42. The obstruction members 46 at the outlet sections 44 of channels 18*a* and 18*c* restrict reactant gas outflow. The unrestricted inflow and restricted outflow results in a pressure build-up in channels 18*a* and 18*c* that forces the reactant gas into the gas exchange layer 20 toward the catalyst (24 for anode side 12 or catalyst 26 for cathode side 14). The reactant gas moves through the gas exchange layer 20 into an adjacent channel 18*b* or 18*d* and exits through the fully open outlet section 44 of channels 18*b* and 18*d*. Forced convection of reactant gas in this manner provides the benefit of greater exposure of reactant gas to the catalyst 24 or 26, thereby increasing the concentration of reactant at the catalyst 24 or 26 and thereby decreasing the performance losses know as diffusion overpotential. However, the restriction of reactant gas flow and associated pressure build-up in the channels 18*a* and 18*c* leads to an increased pressure drop of the reactant gas across the fuel cell stack 10.

The obstruction members 46 at the outlet section 44 of channels 18*a* and 18*c* allow restricted outflow of reactant gas from the channels 18*a* and 18*c*, which reduces the pressure build-up and leads to a lower pressure drop across the fuel-cell stack 10 relative to interdigitated channels that are completely obstructed at either the inlet or the outlet. Thus, the restricted outflow provides a balance between pressure build-up (for forced convection) and pressure drop across the fuel-cell stack 10 (from high pressure build-up).

In one example, the size of the obstruction members 46 is designed to obtain a desirable balance between reactant-gas utilization efficiency and pressure drop across the fuel-cell stack 10. Use of relatively small obstruction members 46 results in lower efficiency (i.e., from less forced convection) and lower pressure drop across the fuel-cell stack 10 (i.e., from less pressure build-up). Use of relatively large obstruction members 46 results in higher efficiency (i.e., from more forced convection) and higher pressure drop across the fuel-cell stack 10 (i.e., from higher pressure build-up in some channels coupled with higher utilization). Given this description, one of ordinary skill in the art will recognize suitable obstruction member 46 sizes to meet their particular efficiency and pressure-drop requirements.

Figure 3:
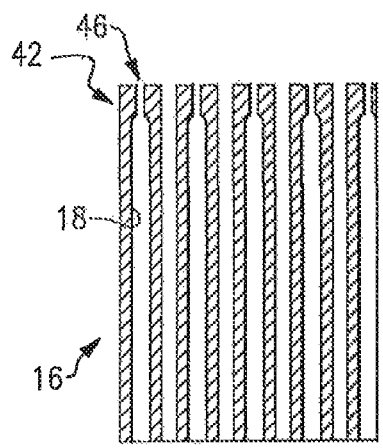
FIG. 3 shows another example obstruction member embodiment having a curved shape.

The obstruction members 46 in the illustrated example are shown in a rectangular shape. In another example shown in FIG. 3, the obstruction members 46 have a rounded shape. Given this description, one of ordinary skill in the art will recognize that a variety of different obstruction member 46 shapes can be used to achieve the beneficial results disclosed and to meet the particular needs of their application.

Figure 4:
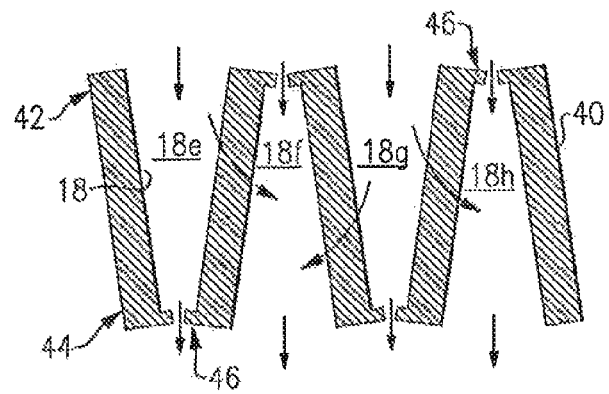
FIG. 4 shows example obstruction members and tapered channels.

Referring to FIG. 4, the channel walls 40 are angled relative to one another to provide a taper in the channels 18 rather than the relatively uniform channel widths of the previous examples. The tapered channels 18 restrict reactant gas flow from the inlet sections 42 to the outlet sections 44 of the channels 18*e* and 18*g*. The reactant gas flow restriction results in pressure build-up in channels 18*e* and 18*g*. As described above, this in turn results in forced convection of the reactant gas toward the catalyst 24 or 26 and into adjacent channels 18*f* and 18*h*. The obstruction members 46 in this example function similarly to those described above to promote forced convection while allowing restricted outflow. Thus, the obstruction members 46 and the taper of the channels 18 cooperate to achieve a desired balance between reactant gas efficiency and pressure drop.

Figure 5A:
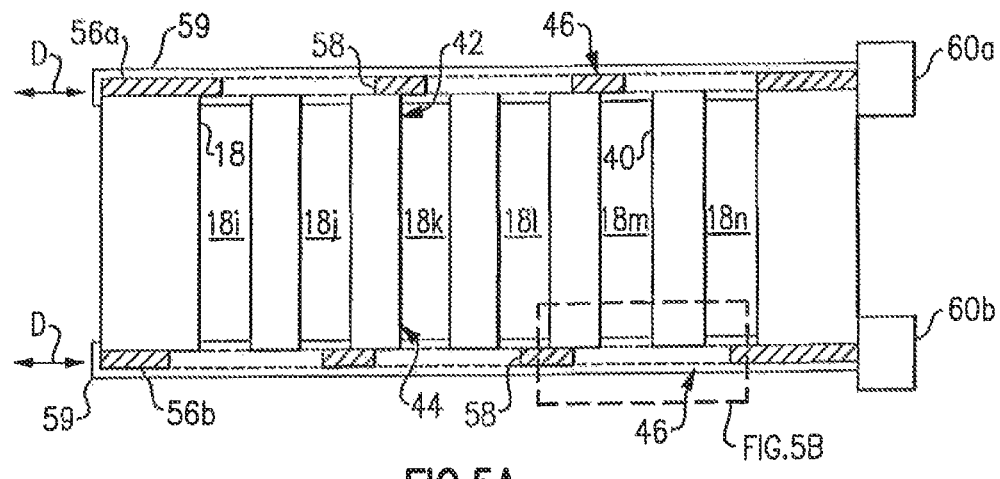
FIG. 5A shows an example obstruction member plate with openings that extend through the plate, wherein the plate is movable relative to the channels to partially block flow through the channels.
Figure 5B:
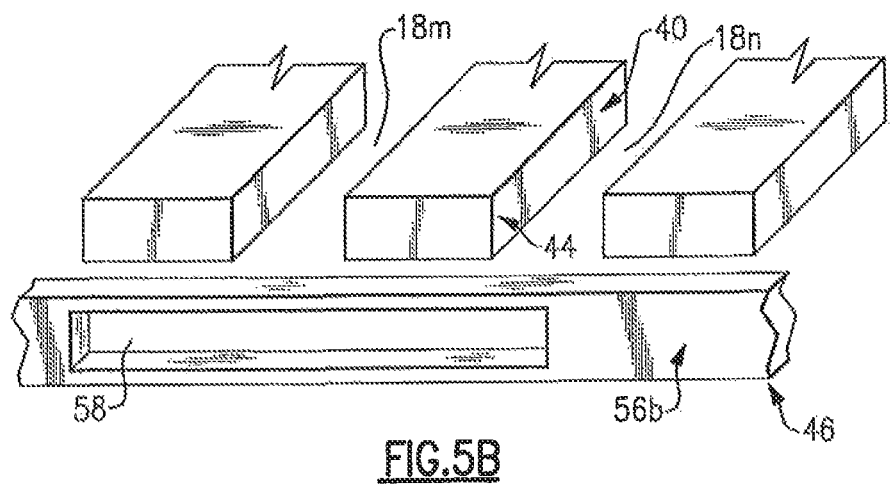
FIG. 5B shows a perspective view of the example obstruction member plate of FIG. 5A.

FIGS. 5A and 5B show an obstruction member 46 embodiment wherein obstruction members 46 include plates 56*a* and 56*b* having openings 58 that extend through the respective plates 56*a* and 56*b*. In this example, each of the channels 18*i*, 18*j*, 18*k*, 18*l*, 18*m*, and 18*n* and the channel walls 40 are approximately the same width. Actuators 60*a* and 60*b*, such as solenoids, move the respective plates 56*a* and 56*b* back and forth along a direction of movement D. In one example, respective tracks 59 guide movement of the plates 56*a* and 56*b* and restrict movement in a direction transverse to the direction of movement D.

In one example, to demonstrate the operation of the plates 56*a* and 56*b*, the actuators 60*a* and 60*b* independently move the respective plates 56*a* and 56*b* to obtain a desired balance between reactant gas efficiency and pressure drop as described above. In the example shown in the illustration, plate 56*a* is in position to block about 50% of the flow passage 38 at the inlet sections 42 of channels 18*i*, 18*k*, and 18*m*. Plate 56*b* is in position to block about 50% of the flow passages 38 at the outlet sections 44 of channels 18*j*, 18*l*, and 18*n*. The actuators 60*a* and 60*b* selectively move the respective plates 56*a* and 56*b* to block a greater or lesser percentage (e.g., between 0% and 100%) of the flow passage 38 cross-sectional area to shift the balance between reactant gas efficiency and pressure drop.

In another example, the plates 56a and 56b provide the benefit of being able to dynamically adjust reactant gas flow through the flow passages 38 in response to differing conditions. In one example, the plates 56a and 56b are moved to block only a small percentage of the flow passage 38 areas during fuel cell start-up (e.g., almost 0% blockage). In another example, plate 56a is moved to the right in the illustration to block a large percentage of the flow passages 38 at the inlet sections 42 of channels 18i, 18k, and 18m (e.g., almost 100% blockage). Plate 56b is moved to the left in the illustration to block a large percentage of the flow passages 38 at the outlet sections 44 of channels 18j, 18l, and 18n (e.g., almost 100%) in response to the end of fuel cell start-up.

In one example, this feature provides the benefit of reducing a phenomenon known as a "start-stop loss." Closure of the channels 18 when the fuel cell stack is inactive (e.g., shut down) resists air infiltration into the channels 18. This minimizes a condition at start-up in which air and an initial flow of reactant gas fuel (e.g., $H_2$) exist on the anode side 12, which can lead to parasitic electrochemical reactions, corrosion, catalyst dissolution, and oxygen evolution in the cathode side 14.

Figure 6:
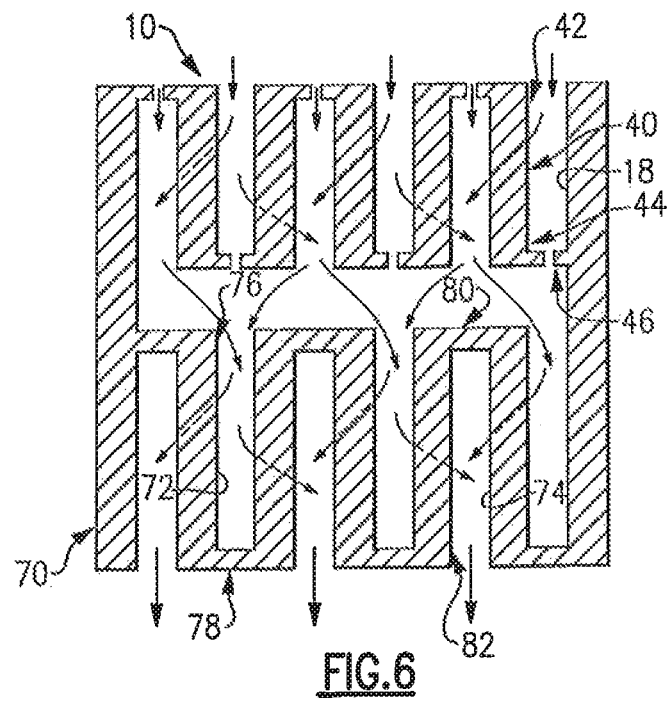
FIG. 6 illustrates an embodiment wherein channels with obstruction members are arranged in series upstream from an interdigitated flow field.

Referring to an example shown in FIG. 6, a modified fuel cell stack 10 includes an interdigitated flow field portion 70. In the illustrated example, the interdigitated flow field portion 70 includes entrance channels 72 and exit channels 74. The entrance channels 72 include fully open inlet sections 76 and fully closed outlet sections 78. The exit channels 74 each include fully closed inlet sections 80 and fully open outlet sections 82. Reactant gas flows from channels 18 that utilize the obstruction members 46 to the interdigitated flow field portion 70.

Generally, the reactant gas concentration decreases as it becomes used up by the catalyst 24 or 26. Thus, at the upstream position of the channels 18, the reactant gas concentration is relatively high and at the downstream position of the interdigitated flow field portion 70 the reactant gas concentration is relatively low. At a relatively high reactant gas concentration, there is significant exposure of reactant gas to the catalyst 24 or 26 without a high degree of forced convection (e.g., from diffusion of reactant gas into the gas exchange layer 20). At a relatively low reactant gas concentration, there is less exposure of reactant gas to the catalyst 24 or 26 and a greater degree of forced convection is useful to increase the exposure.

In the illustrated example, the channels 18 with obstruction members 46 provide a relatively low degree (compared to the interdigitated flow field portion 70) of forced convection, which is appropriate for a relatively high reactant gas concentration, while reducing (or even minimizing in some examples) pressure drop as described above. The interdigitated flow field portion 70 provides a relatively high degree of forced convection to obtain efficient utilization of the relatively lower concentration of reactant gas flow received from the channels 18.

Figure 7:
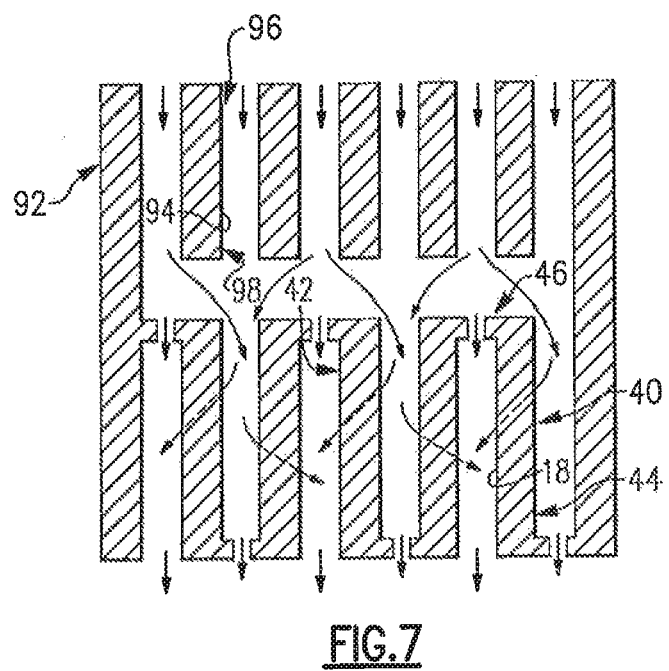
FIG. 7 illustrates an embodiment wherein the channels with obstruction members are arranged in series downstream from a parallel flow field.

Referring to FIG. 7, another modified fuel cell stack 10 example includes a parallel flow field portion 92. The parallel flow field portion 92 includes channels 94 that each have fully open inlet sections 96 and fully open outlet sections 98. The fully open inlet sections 96 and outlet sections 98 allow unobstructed reactant gas flow through the channels 94. This results in diffusion of the reactant gas toward the catalyst 24 or 26 rather than forced convection of the reactant gas.

In this example, the parallel flow field portion 92 provides little or no forced convection, which is appropriate for a relatively high reactant gas concentration, while reducing (or even minimizing in some examples) pressure drop. The channels 18 and obstruction members 46 provide a limited degree of forced convection to obtain efficient utilization of the relatively lower concentration of reactant gas flow received from the parallel flow field portion 92.

Another benefit of the configurations depicted in FIGS. 6 and 7 is that the reactant gas velocities are lower in the inlet regions 18 and 92 than they would be if they had a greater degree of obstruction like the downstream portions of the flow fields. Lower gas velocities can be beneficial because it reduces the risk of dry-out in the inlet region where the inlet gases are typically not fully saturated with water. Lower inlet gas velocities enable relatively small humidification zones.

Figure 8:
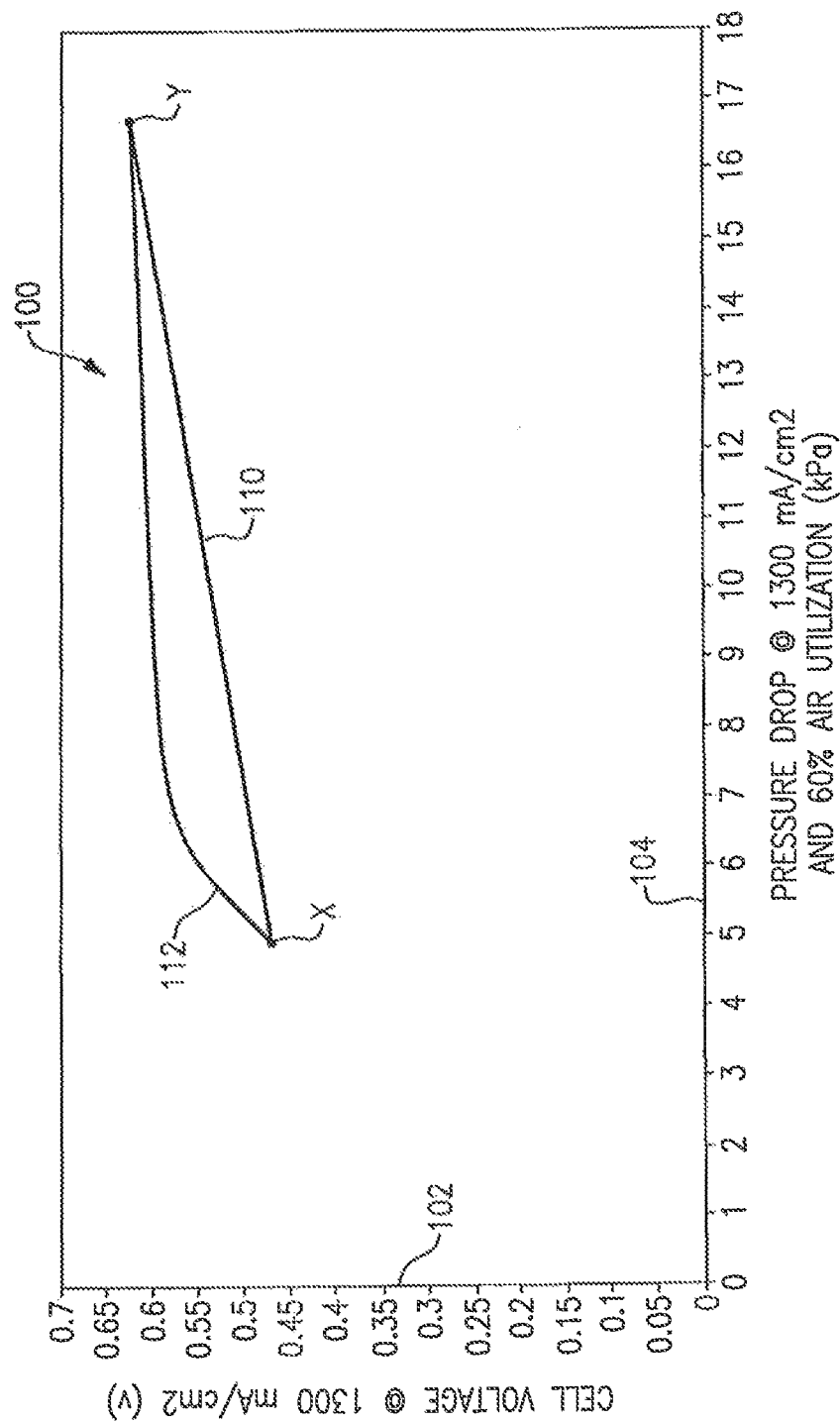
FIG. 8 graphically illustrates an example expected and actual cell voltage vs. pressure drop over a range of obstruction member sizes.

FIG. 8 illustrates an example graph 100 showing cell voltage (measure at a current density of 1300 mA/cm$^2$) on the vertical axis 102 and pressure drop on the horizontal axis 104. Point X represents cell voltage versus pressure drop for a parallel flow field (such as the parallel flow field portion 92 of FIG. 7). Point Y represents cell voltage versus pressure drop for an interdigitated flow field (such as the interdigitated flow field portion 70 shown in FIG. 6). All other aspects of these two cells were identical. One can see from this graph the trade-off between cell performance and pressure drop for these two known types of flow fields.

The line 110 represents an expected cell voltage vs. pressure drop relationship for a range of obstruction member sizes in terms of percentage blocked between 0% (Point X) and a 100% (Point Y). The line 112 is based upon actual data of cell voltage vs. pressure drop over the range of obstruction member 46 sizes. Surprisingly, the line 112 shows higher cell voltages for the same pressure drops compared to the line 110. It should be appreciated that by practicing the flow field design taught herein, one can obtain almost the full performance benefit of a fully interdigitated flow field with just a fraction of the increase in pressure drop associated with this type of flow field.

Although a combination of features is shown in the illustrated examples, not all of them need to be combined to realize the benefits of various embodiments of this invention. In other words, a system designed according to an embodiment of this invention will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A fuel cell flow field plate, comprising:
   a first fuel cell flow field section having a plurality of first channels that are parallel, each first channel having an unobstructed channel inlet and an unobstructed channel outlet; and
   a second fuel cell flow field section having a plurality of second channels, each second channel having a channel inlet section and a channel outlet section, wherein at least one of the channel inlet section or the channel outlet section includes an obstruction member that partially blocks flow through the respective one of the channel inlet section or the channel outlet section, and the second fuel cell flow field section is in flow-receiving communication with the first fuel cell flow field section.

2. The fuel cell flow field plate as recited in claim 1, wherein each second channel comprises a flow passage between elongated channel walls, and the obstruction member extends into the flow passage between the elongated channel walls.

3. The fuel cell flow field plate as recited in claim 2, wherein the obstruction member comprises a first protrusion that extends from one of the elongated channel walls into the flow passage.

4. The fuel cell flow field plate as recited in claim 3, wherein the obstruction member comprises a second protrusion that extends from the other of the elongated channel walls into the flow passage.

5. The fuel cell flow field plate as recited in claim 1, wherein the obstruction members block greater than about 70% and less than about 90% of a nominal cross-sectional area of the second channels.

6. The duel cell flow field plate as recited in claim 5, wherein the obstruction member blocks about 80% of the nominal cross-sectional area.

7. The fuel cell flow field plate as recited in claim 1, wherein the obstruction member includes a first closure member that extends adjacent to one of the channel inlet section or the channel outlet section to partially block flow through the flow passage.

8. The fuel cell flow field plate as recited in claim 7, including a second closure member that extends adjacent the other of the channel outlet section or the channel inlet section to partially block flow through the flow passage.

9. The fuel cell flow field plate as recited in claim 1, wherein the channel outlet section includes an outlet opening at least partially formed by the obstruction member and the channel inlet section includes an inlet opening that is larger than they outlet opening.

10. The fuel cell flow field plate as recited in claim 1, wherein each second channel comprises a curved channel surface.

11. The fuel cell flow field plate as recited in claim 1, wherein each second channel extends between channel walls that are angled relative to one another such that the second channel is tapered.

12. The fuel cell flow field plate as recited in claim 1, wherein each second channel includes a flow passage between a bottom wall, elongated side walls, an open top, a channel inlet section at one end of the elongated side walls, and a channel outlet section at another end of the elongated side walls, wherein the obstruction member includes a protrusion that extends partially into the flow passage from one of the walls, and the protrusion includes a curved surface.

13. The fuel cell flow field plate as recited in claim 1, wherein the obstruction member includes a first plate that is movable to adjust the partial blockage of the flow.

14. The fuel cell flow field plate as recited in claim 13, wherein the obstruction member includes a second plate that is movable independently of the first plate to adjust the partial blockage of the flow.

15. A fuel cell flow field plate, comprising:
a first fuel cell flow field section having a plurality of first channels, each first channel having a channel inlet section and a channel outlet section, wherein at least one of the channel inlet section or the channel outlet section includes an obstruction member that partially blocks flow through the respective one of the channel inlet section or the channel outlet section; and p1 a second fuel cell flow field section having a plurality of interdigitated second channels including entrance channels with fully open inlets and fully closed outlets and exit channels with fully open outlets and fully closed inlets, and the second fuel cell flow field section is in flow-receiving communication with the first fuel cell flow field section. channel inlet section or the channel outlet section includes an obstruction member that partially blocks flow through the respective one of the channel inlet section or the channel outlet section; and a second fuel cell flow field section having a plurality of interdigitated second channels including entrance channels with fully open inlets and fully closed outlets and exit channels with fully open outlets and fully closed inlets, and the second fuel cell flow field section is in flow-receiving communication with the first fuel cell flow field section.

16. The fuel cell flow field plate as recited in Claim 15, wherein the obstruction member includes a first plate that is movable to adjust the partial blockage of the flow.

17. The fuel cell flow field plate as recited in Claim 16, wherein the obstruction member includes a second plate that is movable independently of the first plate to adjust the partial blockage of the flow.

18. The fuel cell flow field plate as recited in Claim 15, wherein a flow path extends through the first channels to the entrance channels, through the entrance channels into a gas exchange layer, through the gas exchange layer into the exit channels, and through the exit channels.

* * * * *

UNITED STATES PATENT AND TRADEMARK OFFICE
CERTIFICATE OF CORRECTION

PATENT NO. : 9,761,889 B2
APPLICATION NO. : 12/094476
DATED : September 12, 2017
INVENTOR(S) : Michael L. Perry et al.

It is certified that error appears in the above-identified patent and that said Letters Patent is hereby corrected as shown below:

In the Claims

Column 7, Line 26:
"The duel cell flow field plate" should read, --The fuel cell flow field plate--.

Column 8, Line 21:
"inlet section or the channel outlet section; and p1 a second fuel cell flow field" should read, --inlet section or the channel outlet section; and a second fuel cell flow field--.

Column 8, Lines 28-38:
"channel inlet section or the channel outlet section includes an obstruction member that partially blocks flow through the respective one of the channel inlet section or the channel outlet section; and a second fuel cell flow field section having a plurality of interdigitated second channels including entrance channels with fully open inlets and fully closed outlets and exit channels with fully open outlets and fully closed inlets, and the second fuel cell flow field section is in flow-receiving communication with the first fuel cell flow field section" should be deleted.

Signed and Sealed this
Twentieth Day of February, 2018

Andrei Iancu
*Director of the United States Patent and Trademark Office*